(12) United States Patent
Kresse et al.

(10) Patent No.: US 6,502,838 B1
(45) Date of Patent: Jan. 7, 2003

(54) TRANSPORT CART FOR CLEANING AND COLLECTING RECYCLABLE WASTE

(75) Inventors: Frank Kresse, Hilden (DE); Klaus-Peter Bansemir, Langenfeld (DE); Heiko Faubel, Hermelskirchen (DE)

(73) Assignee: Ecolab GmbH & Co. OHG, Dusseldorf (DE)

( * ) Notice: Subject to any disclaimer, the term of this patent is extended or adjusted under 35 U.S.C. 154(b) by 0 days.

(21) Appl. No.: 09/530,850

(22) PCT Filed: Oct. 29, 1998

(86) PCT No.: PCT/EP98/06867

§ 371 (c)(1), (2), (4) Date: Aug. 15, 2000

(87) PCT Pub. No.: WO99/23931

PCT Pub. Date: May 20, 1999

(30) Foreign Application Priority Data

Nov. 7, 1997 (DE) .......................... 197 49 206

(51) Int. Cl.⁷ ................................ B62B 3/04
(52) U.S. Cl. .................... 280/47.35; 280/79.3
(58) Field of Search ............ 280/33.991, 33.992, 280/33.997, 47.34, 47.35, 79.11, 79.2, 79.3, 79.5

(56) References Cited

U.S. PATENT DOCUMENTS

| | | | | | |
|---|---|---|---|---|---|
| 2,443,236 A | * | 6/1948 | Gallagher | ................ | 280/47.35 |
| 2,717,801 A | * | 9/1955 | Neil | ..................... | 280/79.3 |
| 3,145,031 A | * | 8/1964 | Wilkinson | ............... | 280/47.35 |
| 3,628,807 A | * | 12/1971 | Fullington | ................ | 280/79.3 |
| 3,870,333 A | * | 3/1975 | Burdick et al. | .......... | 280/47.35 |
| 3,953,044 A | * | 4/1976 | Wilson | ...................... | 280/79.3 |
| 4,381,870 A | * | 5/1983 | Muellner | ................. | 280/47.35 |
| 5,294,009 A | * | 3/1994 | Maurer et al. | ........... | 280/47.35 |
| 5,507,507 A | | 4/1996 | Davidson | ............... | 280/33.991 |
| 5,595,394 A | * | 1/1997 | Adamson | .................... | 280/79.2 |

FOREIGN PATENT DOCUMENTS

| | | | | |
|---|---|---|---|---|
| CH | 651791 | * | 10/1985 | ................ 280/79.2 |
| DE | 206934 | * | 2/1984 | ........... 280/33.991 |
| DE | 9307792 | | 8/1993 | |
| DE | 9402552 | | 5/1994 | |
| EP | 0121075 | * | 10/1984 | ................ 280/79.2 |
| FR | 2532605 | * | 3/1984 | ........... 280/33.992 |
| FR | 2562019 | * | 10/1985 | ........... 280/33.991 |
| FR | 2569151 A | | 2/1986 | |
| FR | 2732937 | | 10/1996 | |
| GB | 922870 | * | 4/1963 | .............. 280/47.35 |
| NL | 108703 | * | 6/1964 | .............. 280/47.35 |
| WO | 88/00148 | * | 1/1988 | ........... 280/33.991 |

* cited by examiner

Primary Examiner—Frank Vanaman
(74) Attorney, Agent, or Firm—Merchant & Gould P. C.

(57) ABSTRACT

A cleaning cart for accommodating and carrying containers and utensils for cleaning, supply and waste collection purposes. The cleaning cart has a base frame which is on rollers, and step shaped support frames which are mounted on the base frame and support carrying elements, the carrying elements being horizontally and vertically offset from each other. The cleaning cart also has a hanging container located behind the support frame. A base plate is fixed on the base frame. The carrying elements are trays which can be hung in the support frame in a cascade arrangement. Space is provided between the hung trays and the base plate for arranging other containers. The support frame has more than two steps. Containers can be placed on the base plate in front of the support frame, and under at least one hung tray.

8 Claims, 3 Drawing Sheets

TRANSPORT CART FOR CLEANING AND COLLECTING RECYCLABLE WASTE

BACKGROUND

1. Field of the Invention

This invention relates generally to a cleaning trolley or cart for collecting and carrying containers and utensils for cleaning, supply and disposal purposes, and more particularly to such cleaning trolleys or carts that also provide for the fractionated disposal of waste and reusable materials, and for the restocking of consumables.

2. Discussion of Related Art

The design and construction of corresponding trolleys has been the subject of numerous strutosals. The more extensive the program to be handled by these trolleys, the more voluminous the trolleys generally are and the less accessible without mutual interference the individual utensils and containers are.

A cleaning trolley of the type in question is known from DE 94 02 552 U1. The advantage of this cleaning trolley lies in the horizontally and vertically offset arrangement of the carrier elements which enables the containers to be arranged in a cascade on the carrier elements. However, the volume that can be accommodated and transported is very small and the space available under the higher container is not used. In addition, the design-related installation of a press is too high both for static reasons and for ergonomic reasons. Another disadvantage is that the dirty water bucket has to be arranged over the clean water bucket so that dirtying of the clean water by water dripping from the dirty water bucket or the mop is unavoidable.

SUMMARY OF THE INVENTION

An object of the present invention is to provide a cleaning trolley or cart that is capable of accommodating a large number of containers and utensils necessary for cleaning purposes, arranged in a manner which substantially eliminates the risk of dirty areas contaminating clean areas, and allows reusable materials intended for disposal as waste to be accommodated or at the same time separated into fractions according to type. In one embodiment of the invention, the aforesaid object and others are provided by a cleaning trolley or cart including a base plate substantially rigidly attached to a base frame, with carrier elements configured as trays designed to be suspended in a cascade in a step-like support frame mounted on the base frame, with space for accommodating further containers being available between the suspended trays and the base plate.

The present stepped and strutted cleaning trolley enables the available space to be optimally utilized and the areas on and beneath the trays to be systematically separated, for example into dirty and clean sectors, while remaining readily accessible. In addition, the suspended trays make it possible—by leaving out trays at the corresponding location between struts of the support frame—to fill the entire space through to the base plate with items of equipment or utensils which have a corresponding vertical dimension. In another embodiment, a container can be placed on the base plate in front of the support frame, to accommodate a tank for wash liquor at that location without any danger of other areas being soiled by dripping water.

In yet another embodiment, a stretching frame with clips for holding at least one refuse sack is provided below a tray suspended from the higher steps of the step-like support frame so that the greater space available at this location can also be used to accommodate voluminous materials to be disposed of as waste. Refuse sacks are particularly suitable for carrying waste paper and soiled light textiles. The spaces below the trays suspended in lower positions are particularly suitable for accommodating shallower containers graduated correspondingly for general waste, waste glass or biological waste which experience has shown to accumulate in relatively small quantities. It is preferred that the various types of waste or soiled materials be kept separated into fractions according to type so that they may be subjected to appropriate treatment or reused.

In one particular embodiment, the support frame has a modular construction. The support frames form modules with two step elements on either side, the modules each consisting of a horizontal strut and a vertical strut which is directed downwards at a right angle at the front end of the horizontal strut. In addition, another two vertical struts are provided per step and form the supporting connection between the rear end of the horizontal struts of each step and the base frame below the base plate. Push-in/screw connections are provided at the ends of all struts so that the step elements and the additional vertical struts can readily be put together and assembled according to the requirements of the particular application. The additional vertical struts are only mounted as a supporting connection on the base plate between the rear end of the uppermost step and the front end of the lower step. It is only when particularly heavy items are carried in the trays that the additional vertical struts need to be mounted under those trays as well. With normal loads, the omission of these vertical struts between the frontmost and rearmost areas affords the advantage of better accessibility of the containers located beneath the trays.

In another embodiment, transverse struts are provided at least partly between the corners of the two-sided steps and between the rear vertical struts. Their function is to stabilize the support frame construction and to form a rest for edges at the longitudinal sides of the trays and, for example, for suspending a rear suspended container. The modular construction of the support frame permits the step to form stable and easy-to-handle modules.

In one particular embodiment, the support frame is higher on one side than on the other side. The trays may be designed in such a way that their side walls extend vertically and their base parallel to the connecting plane of the two opposite steps of the support frame. By virtue of this design, the trays are easy to see and handle from the side of the lower support frame. In addition, it is easy for the person in charge of the trolley to remember that this lower side is the operative side for the "clean sector" of the cleaning trolley, i.e. offers accommodation for new or cleaned items of equipment or utensils and is suitable for carrying cleaning solutions for vertical surfaces and sanitary areas in the trays.

In another embodiment, hinges about which flaps pivot are arranged on the lower side of the support frame below the suspended trays, to emphasize the separation of the clean sector and the dirty sector. The flaps can only be operated from the side opposite the hinges. Accordingly, the person in charge of the trolley can only lift these flaps from the side with the higher support frame so that the waste material can be thrown into the containers covered by the flaps. If the hinges are arranged in such a way that their pivot axis lies laterally below the support frame and vertically just below the lowest point of the corresponding tray, the pivotability of the flap by at least twice the height difference between the sides of the support frame means that the containers and/or stretching frame arranged below the trays must slant towards the higher side of the support frame by at least the same amount as the trays do in the opposite direction. This also ensures that the containers standing on the base plate and the refuse sacks fixed to the stretching frame are easy to see and readily accessible. The releasable fixing of the flaps in the lowermost position by a locking mechanism advantageously prevents unintentional lifting of the flaps or any further downward movement of the flaps in the absence of a container.

One embodiment in which the base frame and the base plate taper frontwards and have a recess in the rear middle section enables the a plurality of cleaning trolleys to be partly pushed into one another from behind. To this end, the dimensions of the recess must be such that the front part of the cleaning trolley to be pushed in from behind fits into this recess as far as the trolleys are to be pushed into one another. It is preferred in this regard to continue the recess longitudinally as far as stretching frames for hanging refuse sacks are arranged under the steps because, in this region, the base plate is normally not needed for removing containers. This has the additional advantage that it is relatively easy to do when empty refuse sacks are hung up because the refuse sacks can be pushed forwards by the cleaning trolley pushed in without stopping the trolleys from being pushed into one another.

If the wheels are end castor wheels, with at least one front wheel being lower than the two rear wheels, this has the advantage that the center of gravity of the cleaning trolley lies safely between the wheels and the base frame and base plate are inclined forwards. This embodiment affords the advantage so far as the "interengaging" of the cleaning trolleys is concerned that the base plate of the rear trolley is located below the base plate of the front trolley, and the recess needs to be as wide as the front vertical struts of the support frame project sideways from one another. The choice of castors affords the additional advantage of providing the cleaning trolley with very good maneuverability. The provision of guide handles on both sides of the suspended container on the rear vertical struts promotes safe control of the cleaning trolley by the person in charge. The provision of a holder for a cleaning utensil designed to be placed in the front container enables the utensil to be positioned in the desired most readily accessible location.

BRIEF DESCRIPTION OF THE DRAWINGS

The above-mentioned advantages and other advantages are clearly illustrated by the following description of an embodiment of the invention in conjunction with the accompanying drawings, in which like items are designated by the same reference designation, wherein.

DETAILED DESCRIPTION OF THE INVENTION

Figure 1:
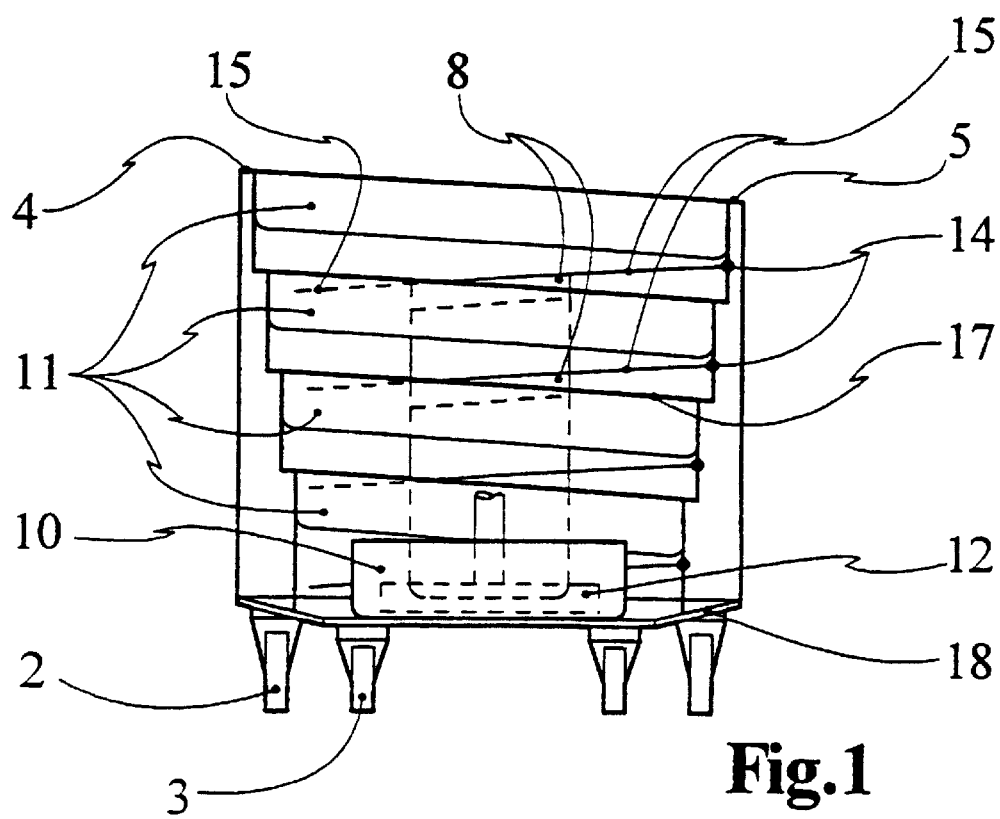
FIG. 1 is a front elevation of a four-step, frontwardly tapering and sloping cleaning trolley where the sides of the support frame have different heights.

The embodiment shown in FIG. 1 tapers and slopes frontwards and has a higher side 4 of the support frame and a lower side 5. FIG. 1 is a front elevation of the present cleaning trolley with suspended trays 11 and the tank 10 in the frontmost position of the base plate 18. The castors 2,3 can clearly be seen, the rear castors 2 being larger and hence higher than the front castors 3. The embodiment with only one castor 3 arranged centrally at the front edge is preferred for certain applications. It can clearly be seen that the support frame 4 on the left-hand side of FIG. 1 is higher than the right-hand side support frame 5. Arranged below the two upper trays 11 are flaps 15 which are designed to pivot about hinges 14. This flap/hinge assembly 14,15 can be provided beneath each step. A cleaning utensil 12 is placed in the tank 10.

It can clearly be seen from FIG. 1 that the sloping arrangement of the trays 11 towards the right-hand side and flaps 15 sloping towards the left-hand side 4, by which the containers 9 (see FIG. 3) can be covered, results in a clear association of the clean sector with accessibility from the righthand side and of the waste or dirty sector with accessibility from the left-hand side or from the front. This clear systematic separation of the clean and dirty sectors also has a disciplinary effect on the person in charge of the trolley. Of the containers to be covered, which are arranged below the trays 11, only the stretching frames 8 arranged under the two highest steps are shown in FIG. 1. The arrangement of a container 9 slanting at its upper edge and its covering by the flap 15 is shown and can clearly be seen in FIG. 5.

Figure 2:
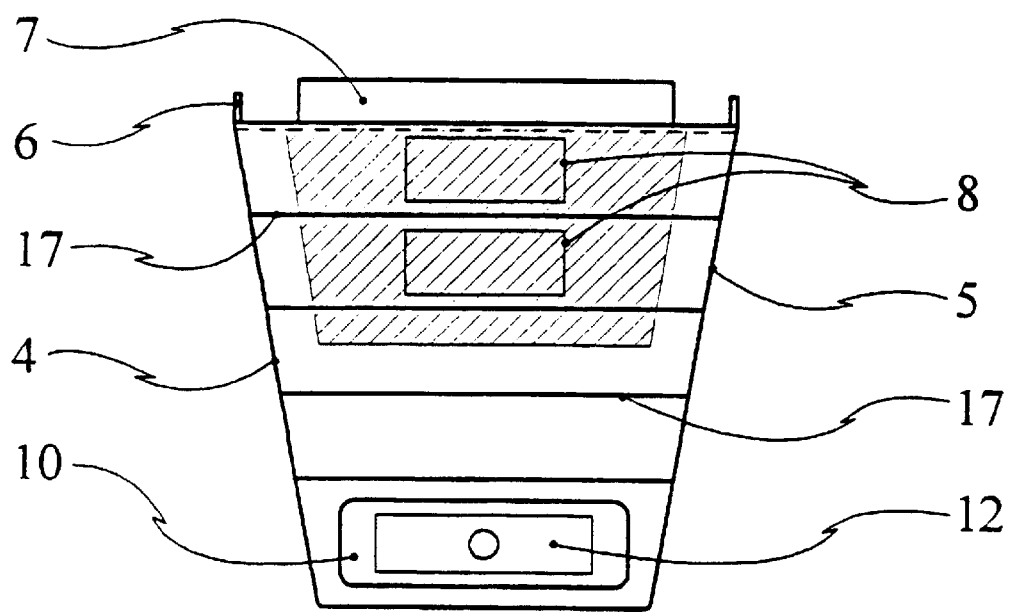
FIG. 2 is a top plan view of the cleaning trolley shown in FIG. 1, but without any suspended trays.

FIG. 2 is top plan view of the cleaning trolley shown in FIG. 1 with the suspended trays 11 left out. The positioning of the stretching frame 8 centrally beneath the two upper steps can clearly be seen. The stretching frames 8 may also be arranged further to the left-hand side with the higher support frame 4 so that they are more readily accessible from the side 4. A transverse strut 17 is arranged between the front and rear ends of the horizontal strut of each step. The handle of the cleaning utensil 12 is designed to be placed in a holder which may be fixed to the frontmost transverse strut 17.

A recess is indicated by shading in the rear middle region of the base plate 18 and enables a cleaning trolley to be pushed from the rear substantially up to the middle of the front cleaning trolley. The guide handles 6 can be seen at the rear end of the cleaning trolley on both sides next to the suspended container 7. The recess can be closed by a cover (not shown) should this space be needed for accommodating additional containers or utensils.

Figure 3:
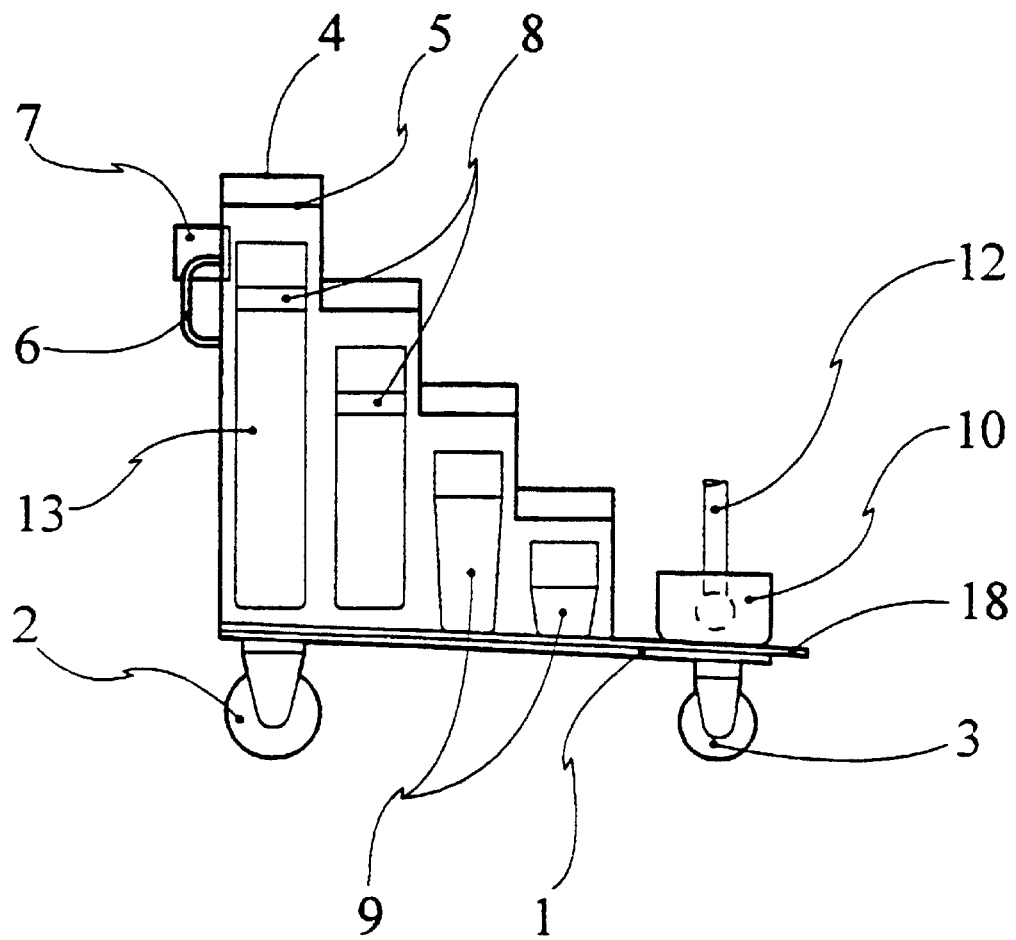
FIG. 3 is a side elevation of the cleaning trolley shown in FIG. 2.

FIG. 3 is a side elevation of the cleaning trolley to which the higher support frame 4 is fixed. It can clearly be seen that the stretching frame 8 is located below the uppermost step at a height above the base plate 18 that permits a very long refuse sack be pushed onto and fixed thereto. The base frame 1 can be seen below the base plate 18. The containers 9 with openings inclined towards the viewing plane are readily accessible from this side providing the flaps 15 (not shown) are raised. An insert of rottable or biodegradable material may advantageously be provided in the container 9 intended for biological refuse. This makes the container 9 easier to empty and keep dean.

Figure 4:
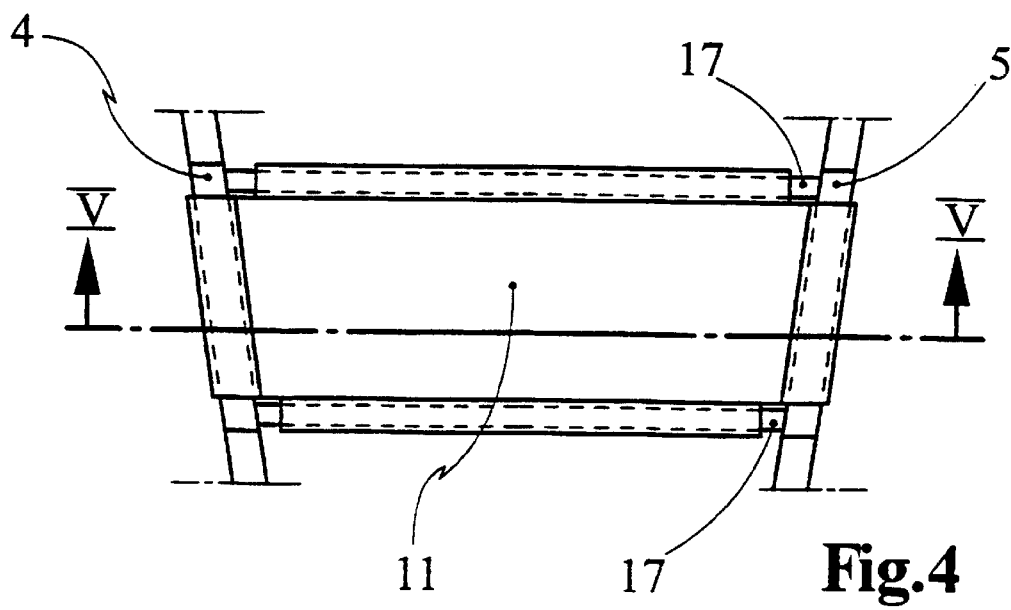
FIG. 4 is a plan view of a tray suspended in one step of the support frame.

The suspended tray 11 can clearly be seen in the plan view of the recess shown in FIG. 4. On all sides, the tray 11 has projecting edges with which it rests on the struts of the support frame 4 and 5 and on the transverse struts 17. This version of a frontwardly tapering tray 11 is particularly suitable for accommodating heavy materials and utensils.

Figure 5:
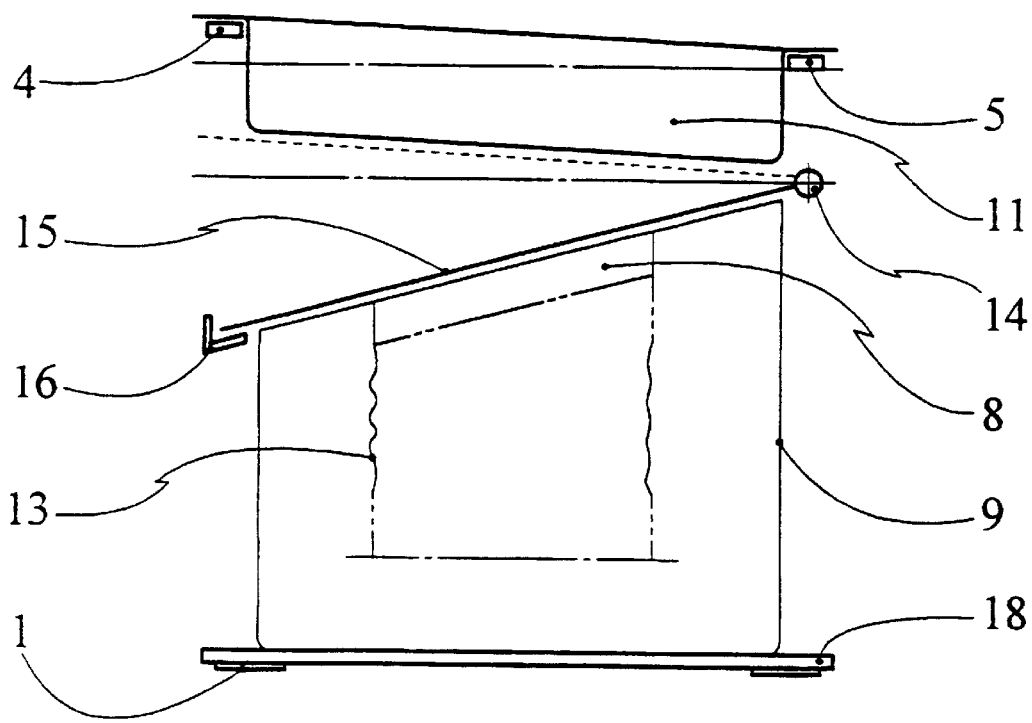
FIG. 5 is a section on the line V—V in FIG. 4.

FIG. 5 is a sectional side elevation on the cross-section line V—V in FIG. 4. The design of the tray 11 resting at its side edges on the horizontal struts of the support frames 4 and 5 can clearly be seen in FIG. 5. In FIG. 5, the struts have a rectangular profile. They may also consist of round or square hollow profiles. Disposed below the tray 11 in the lateral direction beneath the support frame 5 is a hinge 14 about which the flap 15 is designed to pivot. In the illustrated embodiment, the hinge 14 is arranged with its pivot axis at the level where the flap 15 in its uppermost position runs exactly parallel to the bottom of the tray 11 and in its lowermost position extends parallel to the upper edge of the container 9 slanting to the left or the stretching frame 8. The flap 15 is releasably secured in its lowermost position by the locking mechanism 16.

The container 9 is placed on the base plate 18 which is fixed to the base frame 1. The stretching frame 8 and refuse sack 13 shown in dash/double-dot lines show how these elements would be correspondingly arranged beneath the trays 11 of the higher steps if the space between the flap 15 and the base plate 18 were correspondingly large. The arrangement of the hinge 14 in a lower position and/or a more pronounced slant of the upper edge of the container 9 provides for correspondingly greater pivotability of the flap 15 and hence for a large opening for access to the containers 9 and 13. Although various embodiments of the inventions have been shown and described, they are not to be limiting. Those of skill in the art may recognize various modifications to these embodiments, which modifications are meant to be covered by the spirit and scope of the appended claims.

What is claimed is:

1. A cleaning trolley for collecting and carrying containers and utensils for cleaning, supply and disposal purposes comprising a base frame mounted on wheels and, disposed thereon, a step-shaped support frame for carrier elements horizontally and vertically offset from one another; a base plate is fixed to the base frame, said carrier elements including a plurality of trays suspended in a cascade on the steps of said support frame, respectively, and space for accommodating a plurality of second containers being between the suspended trays and the base plate, said support frame having two opposing sides, wherein the support frame is higher on one side than on the opposite side and the trays each have side walls extending vertically on a base parallel to a connecting plane of the two opposing sides of the support frame; further including hinges disposed beneath the suspended trays on a lower side of the support frame, and flaps designed to pivot by a height which on a side opposite a hinge corresponds to at least twice the difference in height between the sides of the support frame and, in their lower position, the flaps being parallel to an upper edge of an underlying container and/or a stretching frame and resting thereon, for closing the container and/or stretching frame.

2. A cleaning trolley as claimed in claim 1, wherein the support frame includes more than two steps, and each of said plurality of second containers are positioned on the base plate and beneath a suspended tray.

3. A cleaning trolley as claimed in claim 1, wherein the stretching frame includes clips for holding at least one refuse sack below a tray suspended in a higher position relative to other of said plurality of trays.

4. A cleaning trolley as claimed in claim 1, wherein said support frame has a modular construction including a support frame step formed on both sides as a module with a horizontal strut and a front strut directed vertically downwards, and two vertical struts per step providing the supporting connection between the rear end of the horizontal strut of each step and the base fame or the base plate, and a supporting connection being mounted on the base frame or the base plate between the rear end of the rear step an the front end of the frontmost step.

5. A cleaning trolley as claimed in claim 4, further including transverse struts between corners of the steps on both sides and between the rear vertical struts.

6. A cleaning trolley as claimed in claim 5, further including guide handles fixed to the rear vertical struts of the support frame on both sides of the container.

7. A cleaning trolley as claimed in claim 5, further including a holder for a cleaning utensil designed to be placed in a frontmost container attached to the front transverse strut between the two sides of the support frame.

8. A cleaning trolley as claimed in claim 1, wherein the wheels are corner castor wheels, and include at least one front castor which is lower than two rear castors.

* * * * *